US010496066B2

(12) United States Patent
Garg et al.

(10) Patent No.: US 10,496,066 B2
(45) Date of Patent: Dec. 3, 2019

(54) SYSTEM AND APPARATUS FOR AND METHODS OF CONTROL OF LOCALIZED ENERGY USE IN A BUILDING USING PRICE SET POINTS

(71) Applicants: The Regents of the University of California, Oakland, CA (US); The International Institute of Information Technology, Telangana (IN)

(72) Inventors: Vishal Garg, Telangana (IN); Niranjan Reddy, Telangana (IN); Sam Babu Godithi, Telangana (IN); Richard E. Brown, Albany, CA (US); Christian Kohler, Oakland, CA (US); Reshma Singh, Palo Alto, CA (US)

(73) Assignee: The Regents of the University of California, Oakland, CA (US)

( * ) Notice: Subject to any disclaimer, the term of this patent is extended or adjusted under 35 U.S.C. 154(b) by 159 days.

(21) Appl. No.: 15/681,086

(22) Filed: Aug. 18, 2017

(65) Prior Publication Data
US 2018/0059633 A1 Mar. 1, 2018

Related U.S. Application Data

(60) Provisional application No. 62/378,633, filed on Aug. 23, 2016.

(51) Int. Cl.
*G05B 19/048* (2006.01)
*H02J 13/00* (2006.01)
(Continued)

(52) U.S. Cl.
CPC ............ *G05B 19/048* (2013.01); *F24F 11/30* (2018.01); *F24F 11/46* (2018.01); *F24F 11/47* (2018.01);
(Continued)

(58) Field of Classification Search
CPC ............... G05B 19/042; G05B 19/048; G05B 2219/2642; H02J 3/14; H02J 13/00;
(Continued)

(56) References Cited

U.S. PATENT DOCUMENTS 5,598,349 A * 1/1997 Elliason ................. G06Q 50/06
700/295
7,062,361 B1 * 6/2006 Lane ....................... F25D 29/00
700/291

(Continued)

OTHER PUBLICATIONS

Bauman, F., et al. 1998. "A field study of PEM (Personal Environmental Module) performance in Bank of America's San Francisco office buildings." CEDR-01-07.

(Continued)

*Primary Examiner* — M. N. Von Buhr

(57) ABSTRACT

This disclosure provides systems, methods, and apparatus related to energy management in a building. In one aspect, a method includes providing a plurality of apparatus. Each apparatus of the plurality of apparatus includes a controller, a light, and a heating/cooling device. The controller is in communication with a control system, and the control system controls the electrical system of a building. A power price is received from the control system at a first apparatus of the plurality of apparatus. The power price is compared to a set point power price. Power supplied to at least one of the light of the first apparatus, the heating/cooling device of the first apparatus, a lighting device in a region proximate the first apparatus, and a heating/cooling device in the region proximate the first apparatus is adjusted based on comparing the power price to the set point power price.

12 Claims, 8 Drawing Sheets

(51) Int. Cl.
*F24F 11/00* (2018.01)
*F24F 11/30* (2018.01)
*F24F 11/47* (2018.01)
*F24F 11/62* (2018.01)
*F24F 11/46* (2018.01)
*H02J 3/14* (2006.01)
*G05B 19/042* (2006.01)
*G06Q 50/06* (2012.01)
*F24F 11/64* (2018.01)

(52) U.S. Cl.
CPC ............ *F24F 11/62* (2018.01); *G05B 19/042* (2013.01); *H02J 3/14* (2013.01); *H02J 13/00* (2013.01); *F24F 11/64* (2018.01); *G05B 2219/2642* (2013.01); *G06Q 50/06* (2013.01); *H02J 2003/146* (2013.01); *Y02B 70/3225* (2013.01); *Y02B 70/3241* (2013.01); *Y02B 70/3275* (2013.01); *Y04S 20/222* (2013.01); *Y04S 20/224* (2013.01); *Y04S 20/227* (2013.01); *Y04S 20/244* (2013.01)

(58) Field of Classification Search
CPC ...... H02J 2003/146; F24F 11/30; F24F 11/46; F24F 11/47; F24F 11/62; F24F 11/64; Y04S 20/222; Y04S 20/224; Y04S 20/227; Y04S 20/244; Y02B 70/3225; Y02B 70/3241; Y02B 70/3275; G06Q 50/06

See application file for complete search history.

(56) References Cited

U.S. PATENT DOCUMENTS

| | | | | |
|---|---|---|---|---|
| 7,130,719 | B2* | 10/2006 | Ehlers | G06Q 10/10 700/276 |
| 8,086,356 | B2* | 12/2011 | Al-Mutawa | G06F 1/26 700/291 |
| 8,855,832 | B2* | 10/2014 | Rees | G06F 1/3206 345/173 |
| 8,977,405 | B2 | 3/2015 | Shiel | |
| 9,244,445 | B2* | 1/2016 | Finch | G05B 15/02 |
| 2010/0324962 | A1* | 12/2010 | Nesler | G01R 21/133 705/7.36 |
| 2011/0231320 | A1 | 9/2011 | Irving | |
| 2012/0031984 | A1 | 2/2012 | Feldmeier | |
| 2012/0150509 | A1 | 6/2012 | Shiel | |
| 2012/0179298 | A1 | 7/2012 | Ha | |
| 2013/0013120 | A1 | 1/2013 | Sabripour | |
| 2013/0013121 | A1 | 1/2013 | Henze | |
| 2013/0085614 | A1* | 4/2013 | Wenzel | G05D 23/1923 700/277 |
| 2013/0226359 | A1 | 8/2013 | Ji | |
| 2013/0274940 | A1* | 10/2013 | Wei | G05B 19/02 700/291 |
| 2014/0018971 | A1* | 1/2014 | Ellis | G06Q 10/04 700/297 |
| 2016/0305678 | A1 | 10/2016 | Pavlovski | |

OTHER PUBLICATIONS

Nordman, B., et al. "Think Globally, Distribute Power Locally: The Promise of Nanogrids," (Green IT column) IEEE Computer, vol. 44, No. 9, pp. 89-91, Sep. 2012.

Nordman, B., et al. "Optimizing Device Operation with a Local Electricity Price," chapter 18 in Decentralized Solutions for Developing Economies: Addressing Energy Poverty Through Innovation; Springer International Publishing, Switzerland, 2015.

Somasundaram, S; et al. "Transaction-Based Building Controls Framework, vol. 1: Reference Guide." Richland, WA: Pacific Northwest National Laboratory. PNNL-23302. Dec. 2014.

Brodrick, J. "What's Next for Solid-State Lighting?" NEMA electroindustry magazine. pp. 26-27. Feb. 2015.

Brambley, M.R., et al. "Advanced Sensors and Controls for Building Applications: Market Assessment and Potential R&D Pathways." Richland, WA: Pacific Northwest National Laboratory. PNNL-15149. Apr. 2005.

* cited by examiner

SYSTEM AND APPARATUS FOR AND METHODS OF CONTROL OF LOCALIZED ENERGY USE IN A BUILDING USING PRICE SET POINTS

RELATED APPLICATIONS

This application claims priority to U.S. Provisional Patent Application No. 62/378,633, filed Aug. 23, 2016, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to building control systems and more particularly to local control of energy use in a building.

BACKGROUND

Buildings generally are conditioned by default with whole building air conditioning and ventilation that are not adjusted based on occupancy levels and the type of work that is performed. Load shedding is incorporated in fairly crude ways, like raising the set-point (e.g., when cooling) in the whole building or dimming all the lights, regardless of the occupants. In buildings in some developing countries there are separate circuits that power all the air conditioning equipment, which can be centrally switched off. Task lights are provided in many buildings, but these are manually switched by the occupants, and often not dimming. There is currently no automatic task level control of loads to deal with constrained energy supply systems and power pricing.

SUMMARY

One innovative aspect of the subject matter described in this disclosure can be implemented in an apparatus including a controller, an input device to accept user input, environmental sensors in communication with the controller, a light, and a heating/cooling device. The controller is in communication with a control system, and the control system controls the electrical system of a building. The controller receives a power price from the control system. The input device is in communication with the controller.

In some implementations, the apparatus further includes a housing, with the controller, the environmental sensors, the input device, the light, and the heating/cooling device being mounted to the housing. In some implementations, the apparatus further includes a wireless network interface, with the apparatus being in communication with the control system through the wireless network interface. In some implementations, the apparatus further includes an electrical output interface, with the electrical output interface including one or more of a wireless charging device, a USB charging port, and an AC power socket. In some implementations, the apparatus further includes an electrical input interface. In some implementations, the apparatus further includes a battery system.

In some implementations, the environmental sensors include one or more of a temperature sensor, a relative humidity sensor, an illuminance sensor, a motion sensor, an air movement sensor, a carbon monoxide sensor, a carbon dioxide sensor, an atmospheric particulate matter sensor, an infrared camera, and a vibration sensor. In some implementations, the user interface includes a smart phone or tablet in communication with the controller.

Another innovative aspect of the subject matter described in this disclosure can be implemented in a method including providing a plurality of apparatus. Each apparatus of the plurality of apparatus includes a controller, an input device to accept user input, environmental sensors in communication with the controller, a light, and a heating/cooling device. The controller is in communication with a control system, and the control system controls the electrical system of a building. The input device is in communication with the controller. A power price is received from the control system at a first apparatus of the plurality of apparatus. The power price is compared to a set point power price. Power supplied to at least one of the light of the first apparatus, the heating/cooling device of the first apparatus, a lighting device in a region proximate the first apparatus, and a heating/cooling device in the region proximate the first apparatus is adjusted based on comparing the power price to the set point power price.

In some implementations, the method further includes measuring or estimating a power use by the first apparatus of the plurality of apparatus, sending the power use to the control system, and receiving a new power price from the control system at the first apparatus of the plurality of apparatus.

In some implementations, the first apparatus further includes an electrical output interface. The method further includes adjusting power supplied to the electrical output interface. In some implementations, the first apparatus further includes a wireless network interface. The first apparatus receives the power price from the control system through the wireless network interface. In some implementations, power supplied to at least one of the light of the first apparatus, the heating/cooling device of the first apparatus, the lighting device in the region proximate the first apparatus, and the heating/cooling device in the region proximate the first apparatus is reduced when the power price is greater than the set point power price. In some implementations, the first apparatus further includes a housing, with the controller, the environmental sensors, the input device, the light, and the heating/cooling device being mounted to the housing. In some implementations, the control system includes a building automation and control system (BACS) and a zone control system.

Another innovative aspect of the subject matter described in this disclosure can be implemented in a method including providing a control system to control the electrical system of a building and a plurality of apparatus. Each apparatus of the plurality of apparatus includes a controller, an input device to accept user input, environmental sensors in communication with the controller, a light, and a heating/cooling device. The controller is in communication with the control system. The input device in communication with the controller. A power price is sent from the control system to a first apparatus of the plurality of apparatus. The power price is compared to a set point power price at the first apparatus. Power supplied to at least one of the light of the first apparatus, the heating/cooling device of the first apparatus, a lighting device in a region proximate the first apparatus, and a heating/cooling device in the region proximate the first apparatus is adjusted based on comparing the power price to the set point power price.

In some implementations, the method further includes measuring or estimating a power use by the first apparatus of the plurality of apparatus at the first apparatus, receiving the power use at the control system, and determining a new power price.

In some implementations, the first apparatus further includes an electrical output interface. The method further includes adjusting power supplied to the electrical output interface. In some implementations, the first apparatus further includes a wireless network interface. The control system sends the power price to the first apparatus via the wireless network interface. In some implementations, power supplied to at least one of the light of the first apparatus, the heating/cooling device of the first apparatus, the lighting device in the region proximate the first apparatus, and the heating/cooling device in the region proximate the first apparatus is reduced when the power price is greater than the set point power price. In some implementations, the first apparatus further includes a housing, with the controller, the environmental sensors, the input device, the light, and the heating/cooling device being mounted to the housing. In some implementations, the control system includes a building automation and control system (BACS) and a zone control system.

Another innovative aspect of the subject matter described in this disclosure can be implemented in a method including providing a plurality of apparatus. Each apparatus of the plurality of apparatus includes a controller, an input device to accept user input, environmental sensors in communication with the controller, a light, and a heating/cooling device. The controller is in communication with a control system, and the control system controls the electrical system of a building. The input device is in communication with the controller. A power budget is received at a first apparatus of the plurality of apparatus from the control system. The power budget is compared to the power being used by the first apparatus. When the power being used by the first apparatus is higher than the power budget, additional power is requested from another of the plurality of apparatus. The additional power is received at the first apparatus, with the additional power being power allocated to a second apparatus of the plurality of apparatus.

In some implementations, the power budget includes an amount of power to be supplied to the first apparatus by the control system. In some implementations, the first apparatus further includes a wireless network interface, and wherein the first apparatus receives the power budget from the control system through the wireless network interface. In some implementations, the control system includes a building automation and control system (BACS) and a zone control system.

Another innovative aspect of the subject matter described in this disclosure can be implemented in a system including a control system and a plurality of apparatus in wireless communication with the control system. The control system controls the electrical system of a building. Each apparatus of the plurality of apparatus includes a controller, an input device to accept user input, environmental sensors, a light, and a heating/cooling device. The controller is in communication with the control system, with the controller to receive a power price from the control system. The input device and the environmental sensors are also in communication with the controller. In some implementations, each of the plurality of apparatus is associated with a workstation in the building.

Another innovative aspect of the subject matter described in this disclosure can be implemented in a local power apparatus for monitoring and controlling electric loads and power consumption in a local environment within a building having a distributed power control system. The local power apparatus includes a controller, a plurality of sensors in communication with the controller, a light, and a temperature control device. The controller is in communication with a central control system. The central control system controls an electrical system of a building. The plurality of sensors senses local environment conditions. The controller is operable to: receive a power price from the central control system; perform a comparison between the power price and a set point power price; and adjust power supplied to at least one of the light and the temperature control device based on the comparison.

In some implementations the controller of the local power apparatus is operable to actuate the light and the temperature control device based on the local environment conditions.

In some implementations, the controller of the local power apparatus is operable to generate a local power price, where the local power price is an amount of power generated using renewable energy sources.

In some implementations, the power supplied is adjusted to at least one of the light of the local power apparatus, the temperature control device of the local power apparatus, a lighting device in the local environment proximate the local power apparatus, and a temperature control device in the local environment proximate the local power apparatus, based on input from the environmental sensors.

In some implementations, the controller of the local power apparatus is operable to: estimate a deficit power price when the set point power price is greater than the power price received from the central control system; communicate a request of the deficit power price to the central control system; and obtain a new power price from the central control system.

In some implementations, the controller of the local power apparatus is operable to: obtain a request of the deficit power price from the central control system; communicate an acceptance to the request of the deficit power price to the central control system when a second apparatus includes an excess power price than a threshold power level; and obtain a new power price from the central control system after providing the deficit power price to the local power apparatus through the central control system.

In some implementations, the local power apparatus further includes a housing, and the controller, the plurality of sensors, the light, and the temperature control device are mounted to the housing.

In some implementations, the controller of the local power apparatus is operable to minimize the power supplied to at least one of the light of the local power apparatus, the temperature control device of the local power apparatus, a lighting device in the local environment proximate the local power apparatus, and a the temperature control device in the local environment proximate the local power apparatus, when the power price is greater than the set point power price.

Another innovative aspect of the subject matter described in this disclosure can be implemented in a central control system for monitoring and controlling electric loads and power consumption in a local environment within the building having a distributed power control system. The central control system includes a controller. The controller is in communication with a local power apparatus. The local power apparatus controls the electric loads of the local environment. The controller is operable to: transmit a power price to the local power apparatus; obtain a request of a deficit power price from the local power apparatus; broadcast the request of the deficit power price to each of the local power apparatus; obtain an acceptance to the request of the deficit power price from a second local power apparatus that includes an excess power price than a threshold power level; create new power prices for the local power apparatus and the second apparatus of the plurality of apparatus based on at least one of (i) a user input received from a user of the local power apparatus, (ii) the power price transmitted to the local power apparatus, and (iii) local environment conditions of the local power apparatus; and communicate the new power prices to the corresponding local power apparatus and the second local power apparatus.

In some implementations, the central control system further includes a building automation and control system (BACS) and a zone control system.

In some implementations, the local power apparatus further includes a housing, where the controller is mounted to the housing.

Another innovative aspect of the subject matter described in this disclosure can be implemented in a method for monitoring and controlling electric loads and power consumption in a local environment within a building having a distributed power control system using a local power apparatus. The method includes: receiving a power price from a central control system; performing a comparison between the power price and a set point power price; and adjusting power supplied to at least one of a light or a temperature control device of the local power apparatus based on the comparison.

In some implementations, the method further includes: estimating, using the local power apparatus, a deficit power price when the set point power price is greater than the power price received from the central control system; communicating, using the local power apparatus, a request of the deficit power price to the central control system; and obtaining, using the local power apparatus, a new power price from the central control system.

In some implementations, the method further includes obtaining, using a second local power apparatus, a request of the deficit power price from the central control system; communicating, using the second local power apparatus, an acceptance to the request of the deficit power price to the central control system when the second local power apparatus includes an excess power price than a threshold power level; and obtaining, using the second local power apparatus, a new power price from the central control system after providing the deficit power price to the local power apparatus through the central control system.

In some implementations, the method further includes minimizing the power supplied to at least one of a light of the local power apparatus, a temperature control device of the local power apparatus, a lighting device in the local environment proximate the local power apparatus, and a temperature control device in the local environment proximate the local power apparatus, when the power price is greater than the set point power price.

Another innovative aspect of the subject matter described in the disclosure can be implemented in a method for monitoring and controlling electric loads and power consumption in a local environment within a building having a distributed power control system using a central control system. The method includes: transmitting a power price to a local power apparatus; obtaining a request of a deficit power price from the local power apparatus; broadcasting the request of the deficit power price to each of the local power apparatus; obtaining an acceptance to the request of the deficit power price from a second local power apparatus that includes an excess power price than a threshold power level; creating new power prices for the local power apparatus and the second apparatus of the plurality of apparatus based on at least one of (i) a user input received from a user of the local power apparatus, (ii) the power price transmitted to the local power apparatus, and (iii) local environment conditions of the local power apparatus; and communicating the new power prices to the corresponding local power apparatus and the second local power apparatus.

In some implementations, the method further includes generating and providing a local power price to each of the local power apparatus to control the electrical loads in the local environment. The local power price is an amount of power generated using renewable energy sources.

In some implementations, the central control system further includes a building automation and control system (BACS) and a zone control system.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
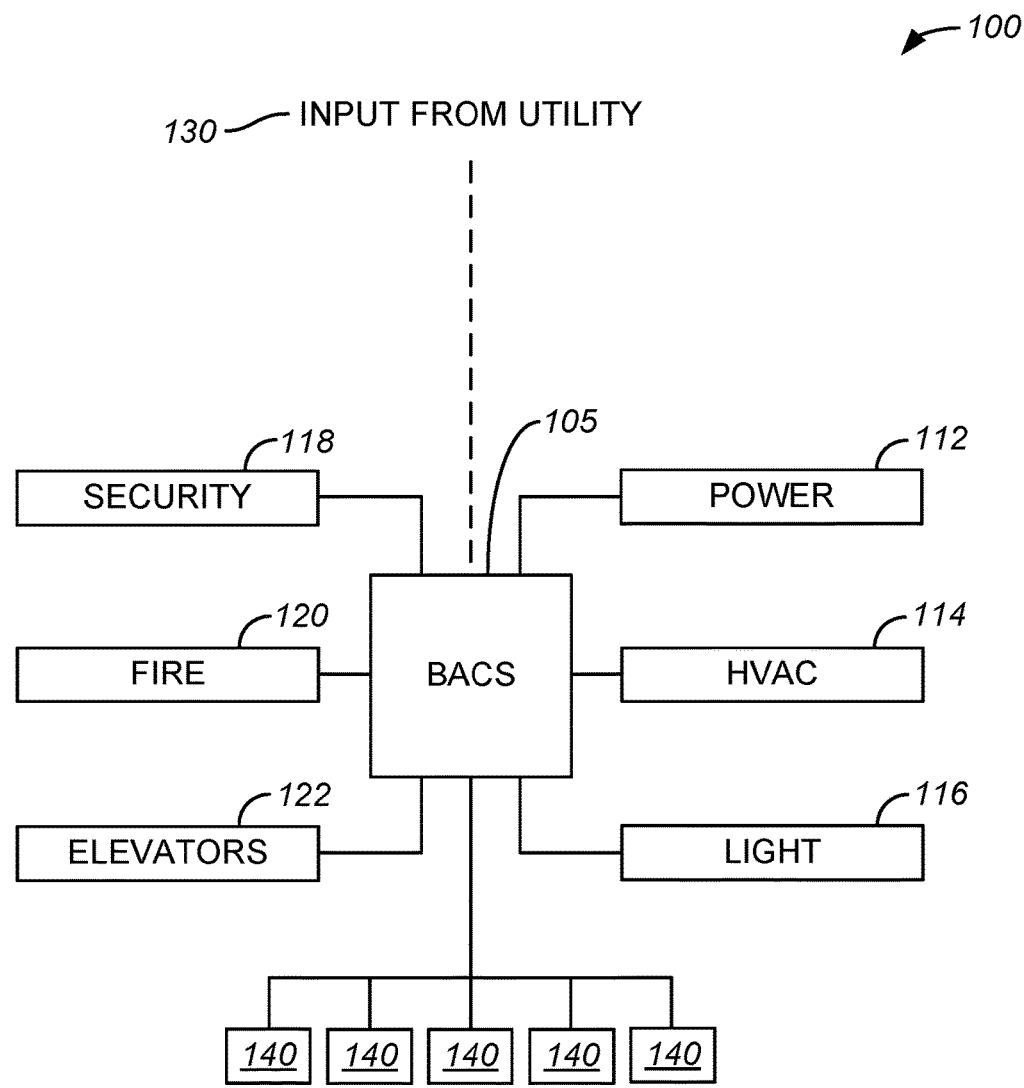
FIG. 1 shows an example of a schematic representation of a control system for a building.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity.

However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

There are several pervasive challenges in buildings that are barriers to achieving energy savings, such as: (1) energy waste due to lack of coordination among building control systems; (2) comfort, lighting systems, and miscellaneous equipment not being controlled with spatial and temporal precision to respond to diverse occupant needs; and (3) loads in buildings not being able to transact or adjust their operation to conserve constrained energy resources (e.g., either in the grid or on-site) in a coordinated, cost-effective way. These challenges have existed in the building sector for decades. Even with the rapid development of computing and communication technologies in the past decade, many of the same problems still exist, such as a lack of self-configuring controls and a lack of interoperability between different types of control systems and different vendors. Nevertheless, some progress has been made for each of these problems.

To address the first challenge of lack of coordination among building controls, efforts are underway to improve interoperability and coordination among building control systems both in government and in industry. Some building control manufacturers (e.g., Johnson Controls, Honeywell, and Siemens) have extended their originally HVAC-focused energy management and control systems (EMCS) to allow integration of lighting controls. However, market adoption of these integrated systems is still low due to: (1) high cost due to the labor-intensive installation and configuration, and the proprietary networking equipment required; and (2) perceived lack of value because these systems do not allow truly integrated applications, such as multi-end use demand response.

The high cost of today's building automation systems is a notable barrier to adoption. One 2009 study estimated that building automation systems typically cost $1.50 to $7 per square foot for purchase, installation, and maintenance. Generally the hardware represented only 10% to 20% of the total system cost—the remainder of the cost was labor for installation and maintenance. Total installed costs for building automation systems will typically be tens of thousands of dollars for small buildings and hundreds of thousands or millions of dollars for medium to large buildings. These systems must produce significant savings to pay off these large initial investments, and purchasers are understandably risk averse when they assess the value of uncertain energy savings from these systems. The cost of these systems could be reduced through improved interoperability of components, and the ability for systems to self-configure.

The second challenge of lack of spatial and temporal precision of controls is being addressed in several ways, such as: (1) In the HVAC end-use, personal climate controls—i.e., where comfort conditioning is delivered to each building occupant according to their expressed needs—have been studied since the 1990s. One company had a commercial product at that time, but it was cost-prohibitive and never saw commercial success. More recently, University of California Berkeley's Center for the Built Environment (CBE) has been developing an improved personal comfort system using low-cost, low-energy components. However, these personal comfort solutions have never been integrated with control of other end-uses, nor integrated into transaction-based control systems.

(2) In the lighting end-use, major manufacturers have introduced products in the last few years that allow each individual fixture to autonomously adjust its operation based on occupancy and daylight in the immediate area of the fixture. These systems, however, are not easily integrated into a broader system that would be needed to enable zone- or building-wide demand response or transaction-based controls.

(3) In the case of plug loads, the current state of the art in controls is the relay-controlled outlet, which turns off power to an outlet in response to a control signal. This control signal can be based either on the local power status of a "master" outlet on the same power strip, or a signal received over the network. These methods have several significant drawbacks: (1) turning off the power to an outlet is done regardless of what device is plugged in (i.e., a computer is treated the same way as a task light or refrigerator); (2) the power cycling is a crude, binary type of control that completely disables the plug load device and can be confusing to the user to turn back on; (3) the master/slave plug strips are not networked and cannot be integrated into a whole-building control system; and (4) the network plug strips that are available on the market are proprietary, closed systems that only allow access to data and actuation through the manufacturer's subscription-based cloud data service.

The third challenge of lack of transaction-based controls is a known problem that the U.S. Department of Energy's Building Technologies Office (BTO) has identified in its multi-year program plan. Transaction-based controls are based on the concept that buildings should be managed dynamically according to economic principles such that the scarcity of the resources they consume (i.e., energy) is reflected in how the building is operated. Current building controls operate entirely based on physical parameters, for example, temperature, light levels, or air flow rates, and energy availability or price is completely absent from these traditional control algorithms.

Moving to transaction-based controls will require a shift in the way controls are designed. A key issue with implementing these controls is that building systems need to be self-aware in a way that they can understand their current operational state, can project their future operational state, and have an understanding of what the trade-off is between energy used and services delivered. These type of devices do not exist today.

Described herein are systems, methods, and apparatus related to local control (e.g., at a workstation level or task control) of energy use in a building. A Building Automation and Control System (BACS) is hardware (and its associated software) system for monitoring and controlling the electrical and mechanical systems in a building. The electrical and mechanical systems can include a security system, a power management system, a system to control elevators, a fire detection and suppression system, a system to control the lighting, a ventilation system (e.g., HVAC), and the like.

A BACS can control the indoor environment of a building to help to ensure comfort of the occupants of the building. A BACS can also control energy use in a building to more efficiently use energy. For example, a BACS can be set to adjust the lighting systems and the heating, ventilation, and air conditioning systems in a building to consume less energy when the building is unoccupied. A BACS may also receive signals related to the price of energy from the energy grid that powers a building.

FIG. 1 shows an example of a schematic representation of a control system for a building. As shown in FIG. 1, a control system 100 includes a BACS 105 in communication with a number of systems in the building, including a power system 112, a heating, ventilation, and air conditioning system (HVAC) 114, and a lighting system 116. In some embodiments, the BACS 105 is also in communication with additional systems in the building, including a security system 118, a fire detection and suppression system 120, and an elevator system 122. The BACS 105 is also able to receive input 130. The input 130 can be communicated to the BACS 105, for example, wirelessly, over Ethernet, or by other electronic means. The input 130 can include the current prices of power from utilities and/or the estimated future prices of power from utilities.

The system 100 also includes a plurality of local power apparatus 140. While only five local power apparatus 140 are shown in FIG. 1, there may be tens, hundreds, or thousands of local power apparatus 140 in a building. A local power apparatus 140 may be associated with a number of or all of the workstations in a building. For example, a local power apparatus 140 may be on a number of or all of the desks or tables in the building. A local power apparatus is described further below. The local power apparatus 140 may be any of the local power apparatus described herein.

In some embodiments, the plurality of local power apparatus 140 are a component of a distributed power control system in the building. The use of "distributed power control system" here is meant to indicate that the power use by the building is not sensed and controlled by a single controller of the building (e.g., the BACS). Instead, power use by the building is sensed and controlled by a number of controllers, including the BACS 105 and the plurality of local power apparatus 140.

Figure 2:
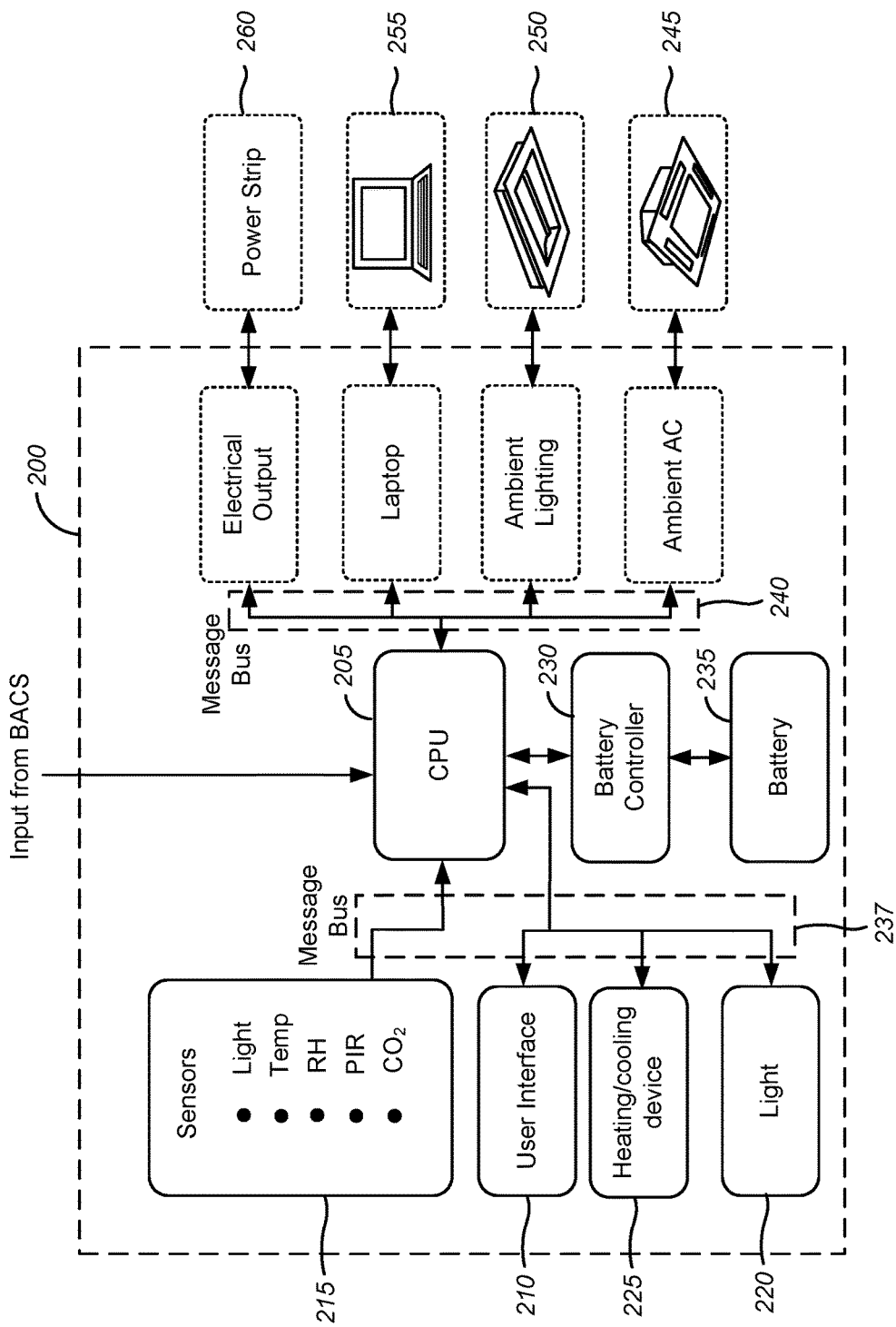
FIG. 2 shows an example of a schematic representation of a local power apparatus.

FIG. 2 shows an example of a schematic representation of a local power apparatus. The apparatus 200 shown in FIG. 2 can control, at least in part, energy use at a workstation, a desk, or in an office by a person or persons, for example. The apparatus 200 includes a controller 205, an input device or user interface 210 in communication with the controller 205, environmental sensors 215 in communication with the controller, a light 220, and a heating/cooling device 225.

In some embodiments, the controller 205 comprises a central processing unit (CPU), a processor, a microprocessor, or other integrated circuit. The controller is operable to receive input from devices in communication with the controller and to actuate devices connected to it. The controller is also in communication with a BACS. The controller can receive information about the quantity of power available from local sources and the grid, including the price of power (i.e., a power price) and an availability of power.

In some embodiments, the apparatus 200 includes a wireless network interface (not shown). The apparatus 200 may be in communication with the BACS through the wireless network interface. In some embodiments, the wireless network interface comprises a Wi-Fi interface or a Bluetooth interface. In some embodiments, the controller 205 is operable to send information to the BACS. For example, the controller 205 may send information regarding the power being used by the apparatus 200 or the estimated amount of power to be used by the apparatus 200.

The input device 210 is operable to accept user input. In some embodiments, the input device 210 comprises an interface through which a user's smart phone or tablet can input information to the apparatus 200. In some embodiments, the input device 210 comprises a touch screen. In some embodiments, the input device 210 is operable to receive user input to change set points that will change the operation of the apparatus 200 or to turn devices of the apparatus 200 on/off.

In some embodiments, the environmental sensors 215 includes one or more of a luminance (i.e., light) sensor, a temperature sensor, a relative humidity sensor, an atmospheric particulate matter sensor, a carbon monoxide sensor, a carbon dioxide sensor, a motion sensor, an air movement sensor, an infrared camera or a passive infrared sensor (PIR), and a vibration sensor. The environmental sensors 215 can monitor the local environment associated with the apparatus 200 (i.e., a workstation or the area surrounding a desk) and the controller 205 can actuate devices of the apparatus 200 depending on the environmental conditions. For example, when the light level falls below a specified value, the light 220 may be turned on.

The light 220 may be a number of different kinds of lights. In some embodiments, the light 220 comprises a LED. Similarly, the heating/cooling device 225 may be a number of different kinds of heating/cooling devices. In some embodiments, the heating/cooling device 225 comprises a fan, a water cooled or water heated desk, or a Peltier cooler.

In some embodiments, the apparatus includes a power supply or an electrical input interface. In some embodiments, the power supply comprises a battery system. A battery system may include, for example, a battery controller 230 and a battery 235. In some embodiments, and electrical input interface comprises an AC power plug or power over Ethernet plug.

In some embodiments, the apparatus 200 includes devices that a user may use for communication with other people in the building that also have an apparatus at their desk or workstation. For example, in some embodiments the apparatus 200 includes a speaker, a microphone, and a camera (not shown).

In some embodiments, the apparatus 200 includes message busses 237 and 240. The message bus 240 may be able to communicate with and/or control devices that are not part of the apparatus 200 but affect the local environment in which the apparatus 200 is located (e.g., regions proximate the apparatus 200, such as a workstation, desk, or office). For example, the message bus 240 may be able to communicate with and/or control the local ambient air conditioning 245 and the local ambient lighting 250. The message bus 240 may allow the apparatus 200 to communicate with a computer 255. In some embodiments, the message bus 240 controls an electrical output interface 260 of the apparatus 200. For example, in some embodiments, the message bus controls the amount of power output to a wireless charging device of the apparatus 200, a USB charging port of the apparatus 200, or an AC power socket of the apparatus 200.

Figure 3:
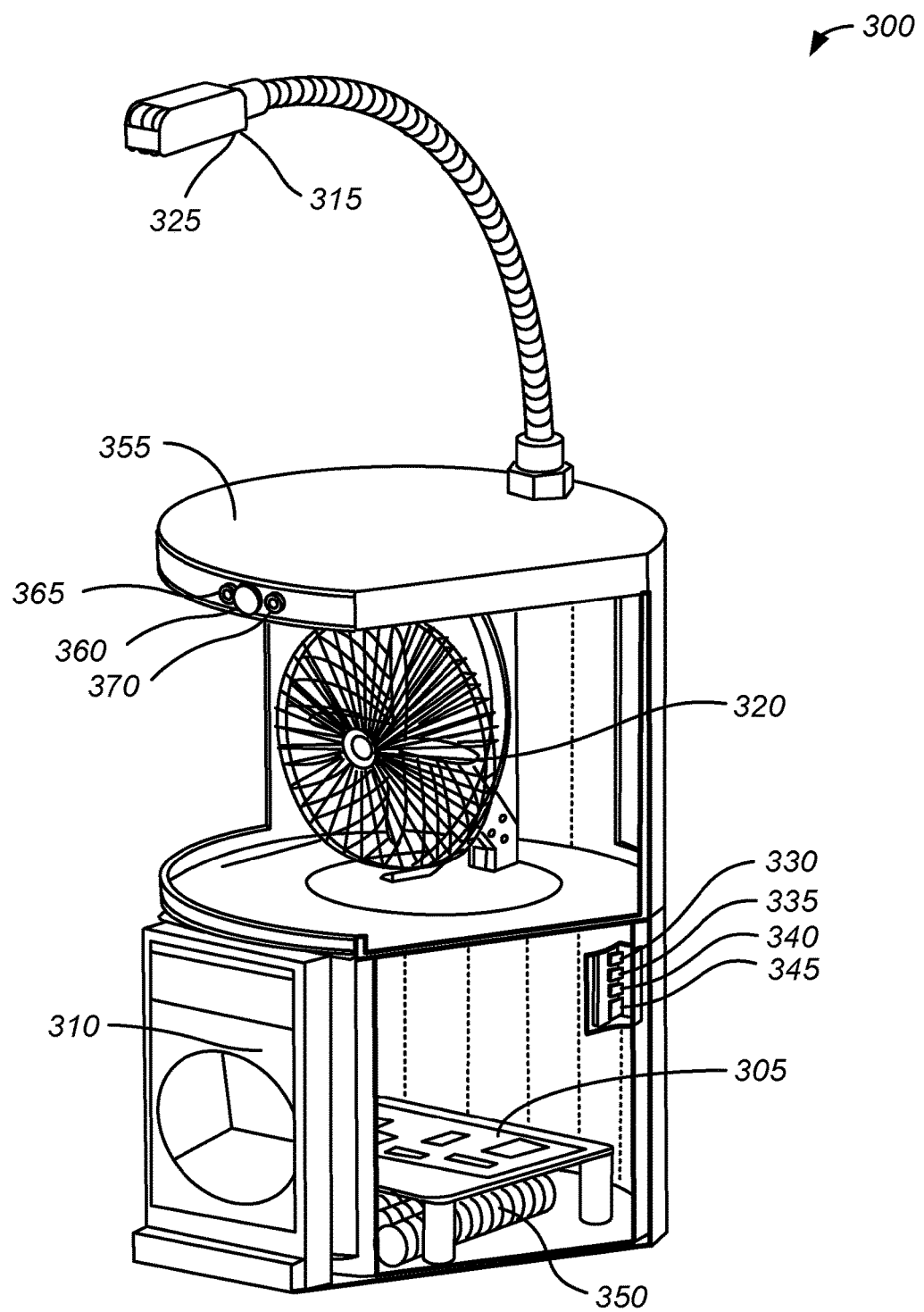
FIG. 3 shows an example of a schematic illustration of a local power apparatus.

FIG. 3 shows an example of a schematic illustration of a local power apparatus. The apparatus 300 shown in FIG. 3 includes a controller 305, an input device 310, environmental sensors, a light 325, and a heating/cooling device 320 (i.e., a fan). The apparatus 300 further includes a motion sensor 360, a status light 365, and a status light 370. In some embodiments, the environment sensors comprise a luminance sensor 315, a carbon dioxide sensor 330, a relative humidity sensor 335, a temperature sensor 340, and an atmospheric particulate matter sensor 345. The input device 310 of the apparatus 300 comprises an interface through which a user's smart phone or tablet can input information to the apparatus 300. The input device 310 may also display information regarding the operation of the apparatus 300.

In some embodiments, the apparatus 300 includes a battery system 350. While not shown, in some embodiments, the apparatus 300 includes the sensors/devices described above with respect to the apparatus 200. In some embodiments, the apparatus 300 includes a housing 355. The controller 305, the input device 310, the environmental sensor, the light 325, and the heating/cooling device 320 are mounted to and/or contained by the housing 355. The operation of local power apparatus and a control system for a building are further described below in the methods.

In some embodiments, the status light 365 and the status light 370 comprise light-emitting diodes (LEDs). In some embodiments, the status lights 365 and 370 provide information about the operation of the apparatus 300. In some embodiments, when an input device 310 comprising a user's smart phone or tablet is interfaced or connected to the apparatus 300, the status lights 365 and 370 are disabled and do not operate. The status lights 365 and 370 may be used to indicate that the apparatus 300 needs to or must reduce the power used being used by the first apparatus 300, as explained further in the methods below. The status lights 365 and 370 also may be used to indicate that the user input is needed at the apparatus 300.

Figure 4:
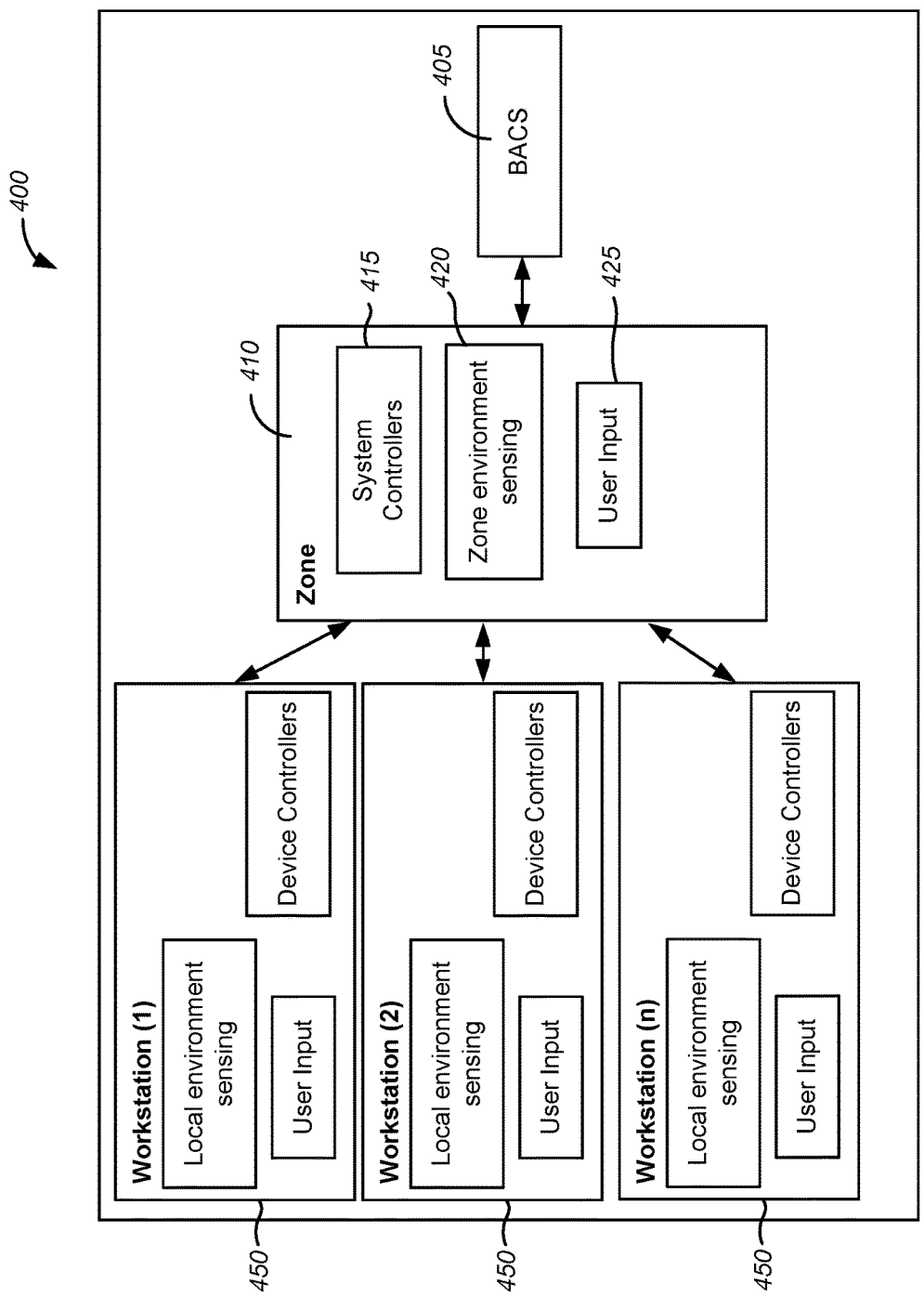
FIG. 4 shows an example of a schematic representation of a control system for a building.

FIG. 4 shows an example of a schematic representation of a control system for a building. The control system 400 shown in FIG. 4 is similar to the control system 100 shown in FIG. 1, with the addition of zone control systems. A zone of a building may comprise a specific section of a building, such as a floor of a building or a section of a floor or a building, for example.

The control system 400 includes a building automation and control system (BACS) 405, a zone control system 410, and a plurality of local power apparatus 450. While only a single zone control system 410 is shown for simplicity, the control system 400 includes a plurality of zone control systems. Similarly, while only three local power apparatus 450 are shown in FIG. 4, there may be tens, hundreds, or thousands of local power apparatus 450 associated with a zone.

In some embodiments, the BACS 405 performs similar functions to the BACS 105 shown in FIG. 1. In some embodiments, the zone control system 410, operating in conjunction with the BACS 405, controls the environment of the zone of the building with which the zone control system 410 is associated. In some embodiments, the zone control system 410 includes a controller 415, zone environmental sensors 420, and an input device 425. In some embodiments, the controller 415 comprises a central processing unit (CPU), a processor, or a microprocessor. In some embodiments, the zone environmental sensors 420 comprise one or more of a luminance (i.e., light) sensor, a temperature sensor, a relative humidity sensor, an atmospheric particulate matter sensor, a carbon monoxide sensor, a carbon dioxide sensor, a motion sensor, an air movement sensor, an infrared camera, and a vibration sensor. In some embodiments, the zone environmental sensors 420 are in communication with the controller 415. In some embodiments, the input device 425 comprises an interface through which a user's smart phone or tablet can input information to the zone control system 410. In some embodiments, the input device 425 comprises a touch screen.

The plurality of local power apparatus 450 are in communication with the zone control system 410, and through the zone control system 410, in communication with the BACS 405. A local power apparatus 450 may comprise any of the local power apparatus described herein.

A local power apparatus can be used to control the local environment (e.g., the environment such as lighting and heating/cooling at a desk or a workstation) in a building. The control of the local environment can lead to less energy usage by the building. Also, when the power available to the building is limited (e.g., on a hot day when the power available on the grid is low), a local power apparatus can aid in reducing the energy use by the building.

Figure 5:
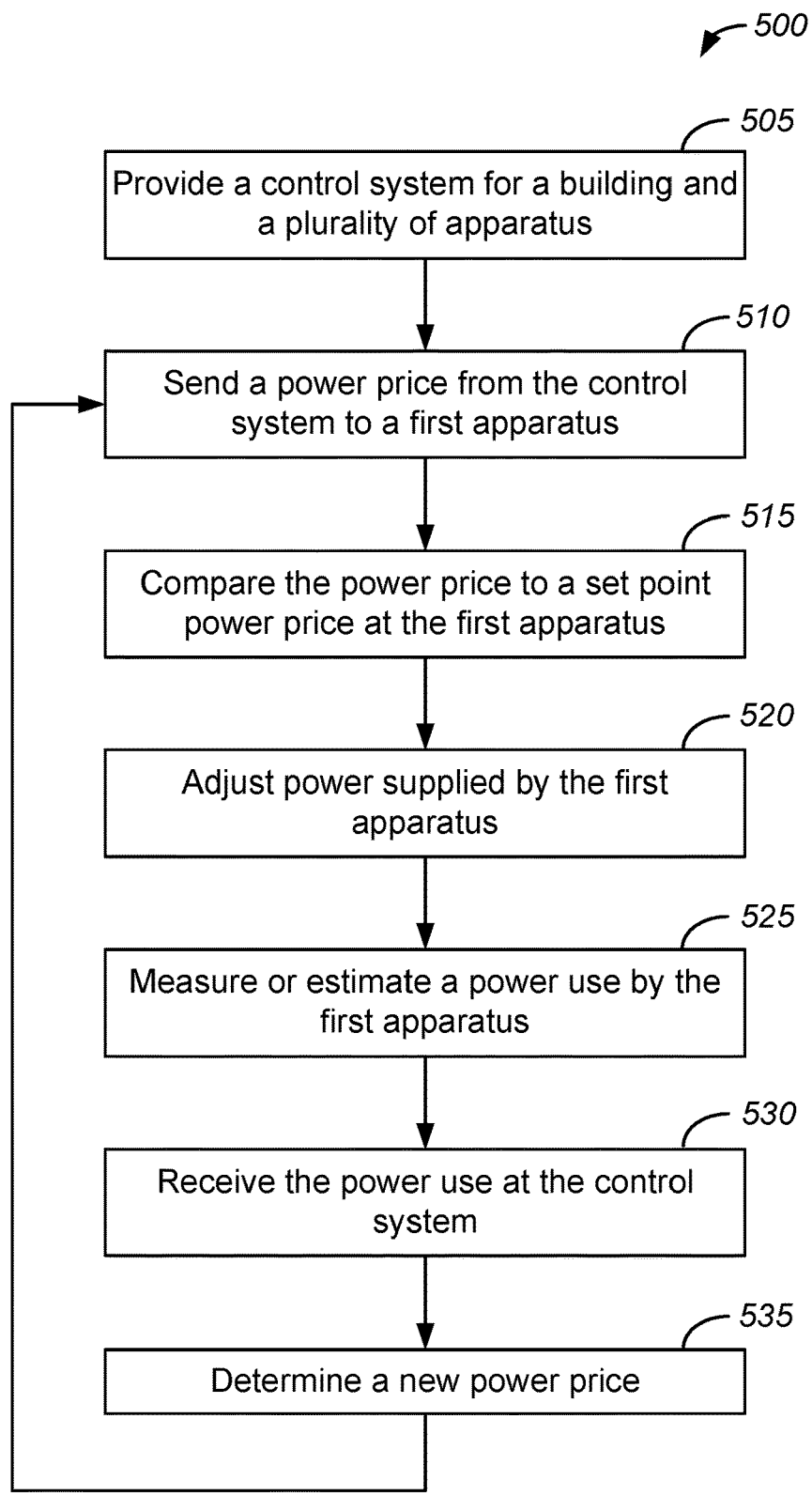
FIG. 5 shows an example of a process for controlling energy use by a building.

FIG. 5 shows an example of a process for controlling energy use by a building. Starting at block 505 of the method 500 shown in FIG. 5, a control system to control the electrical system of a building is provided. The control system may be, for example, a building automation control system (BACS) or a controller for a zone in a building that is in communication with a BACS. A plurality of local power apparatus also is provided. The plurality of local power apparatus is located in a building, with each local power apparatus of the plurality of local power apparatus in communication with the control system. The method 500 can be performed using any of the BACS, zone control systems, and local power apparatus described herein.

At block 510, a power price is sent from the control system to a first apparatus of the plurality of apparatus. While the method 500 is described with respect to a single apparatus (i.e., the first apparatus), the method may be performed concurrently with the plurality of apparatus. In some embodiments, the power price includes the current price of power from utilities or the estimated future prices of power from utilities. For example, the power price may be communicated by the control system to the first apparatus using a wired or wireless communication protocol.

In some embodiments, the power price includes a local price of power (i.e., the power price is not necessarily a utility power price). The price of power that the control system determines may depend on a number of factors. For example, even if power from utilities from the grid is expensive, the power price may be low due to local sources of power being available. Local sources of power may include sources of power associated with the building, including solar power, wind generated power, power from a turbine, power from a fuel cell, and power from batteries, for example. The power price may include the future expected demand for power. For example, the power price may be increased when the weather forecast indicates a hot day.

At block 515, the power price is compared to a set point power price at the first apparatus. The set point power price includes a specified power price. In some embodiments, the comparison is performed with a price response function. The price response function includes instructions for how the first local power apparatus operates depending on the power price.

At block 520, power supplied to at least one of the light of the first apparatus, the heating/cooling device of the first apparatus, a lighting device in a region proximate the first apparatus, and a heating/cooling device in the region proximate the first apparatus is adjusted (e.g., increased or decreased) based on comparing the power price to the set point power price. The lighting device and the heating/cooling device in the region proximate the first apparatus may include lighting devices and heating/cooling devices that are installed in the building. In some embodiments, the apparatus has local control of these devices that are installed in the building.

The user of the first apparatus can specify (e.g., through the input device) at least in part a response of the first apparatus to the power price. For example, the user can set a baseline operation of the apparatus. In some embodiments, when the power price is below the set point power price, operation of the first apparatus continues at the baseline. In such a case, the power price is not high, so the first apparatus continues operation per the baseline specification.

In some embodiments, when the power price is above the set point power price, the first apparatus changes power use to use less power. The user can specify the response of the apparatus away from the baseline. For example, the user may wish to have the lights be dimmed while keeping the heating/cooling devices operating per the baseline. In some embodiments, when the power price is above the set point power price and above a price threshold, the apparatus shuts off power to at least some or all of the devices associated with the apparatus.

In some embodiments, the power use is not reduced directly. In some embodiments, the power use is reduced as a result of changing a temperature set point associated with a heating/cooling device or changing a luminance set point associated with a light. For example, in some embodiments, changing the temperature set point is similar to changing a temperature set point on a thermostat (e.g., a higher temperature when using a cooling device or a lower temperature when using a heating device). In some embodiments, a user can specify a lighting level or a temperature.

In some embodiments, the plug loads of an energy strip or power strip connected to the first apparatus may be reduced. For example, when a laptop computer is plugged into an energy strip and is charging, the first apparatus may instruct the laptop computer to stop charging or to charge at a slower rate in order to reduce the energy use by the first apparatus. This operation may be accomplished by communications between the first apparatus and the operating system of the laptop computer. For example, the laptop computer may be running software that registers, associates, and send the laptop computer battery charge level to the first apparatus. Based on the battery charge level, the first apparatus may send instructions to the operating system of the laptop computer to stop charging or to charge at a slower rate.

In some embodiments, when the first apparatus is in communication with an energy strip, the first apparatus adjusts the threshold power price of the plug to which a laptop battery charger is connected. When the power price is above the threshold power price of the plug, the energy strip switches OFF the power to the plug to reduce the energy demand. When the battery charge level of the laptop falls below a specified level, the first apparatus reduces the threshold power price of the connected plug such that the threshold power price is below the power price. The energy strip then switches the power ON and the laptop battery charges.

In some embodiments, when a laptop computer is plugged into an energy strip and the laptop computer is in operation, the first apparatus may instruct the computer to operate in a mode that uses less power (e.g., a power save mode or a balanced mode instead of a high performance mode).

In some embodiments, a response of the first apparatus to the power price can be overridden or cancelled by a user. For example, the user may be able to delay the response of the first apparatus for a specified time period. This may be useful in instances when the user is about to leave the workstation for the day and wishes to have the first apparatus operating at the baseline for the period before the user leaves.

At block 525, a power use by the first apparatus of the plurality of apparatus is determined or estimated at the first apparatus. For example, after block 520, power use by the first apparatus may increase or decrease. This is the power use that is determined or estimated. For example, the first apparatus can determine or estimate the power being used by the first apparatus and all of the devices associated with the first apparatus.

At block 530, the power use by the first apparatus is received at the control system. For example, the power use by the first apparatus may be communicated from the first apparatus to the control system using a wired or wireless communication protocol.

At block 535, a new power price is determined. In some embodiments, the new power price is determined at or by the control system. For example, the control system may receive a power use from the first apparatus and a number of or all of the plurality of apparatus. Using this power use, the control system can determine the power needed or required by the building. The control system can then look to the available power sources and the price of power from those power sources. By choosing the combination of the lowest cost power sources available (e.g., power from utilities though the grid and local power) that can satisfy the consumption of power by the building, the control system can determine a new power price. In some embodiments, the new power price can be the price of power at a single point in time. In some embodiments, the new power price can be a forecast power price (e.g., the estimated future price of power).

After block 535, the process 500 can continue at block 510, with the new power price being sent to the first apparatus. Block 515 and 520 may be repeated with the new power price, with the process 500 then continuing at blocks 525, 530, and 535.

Figure 6:
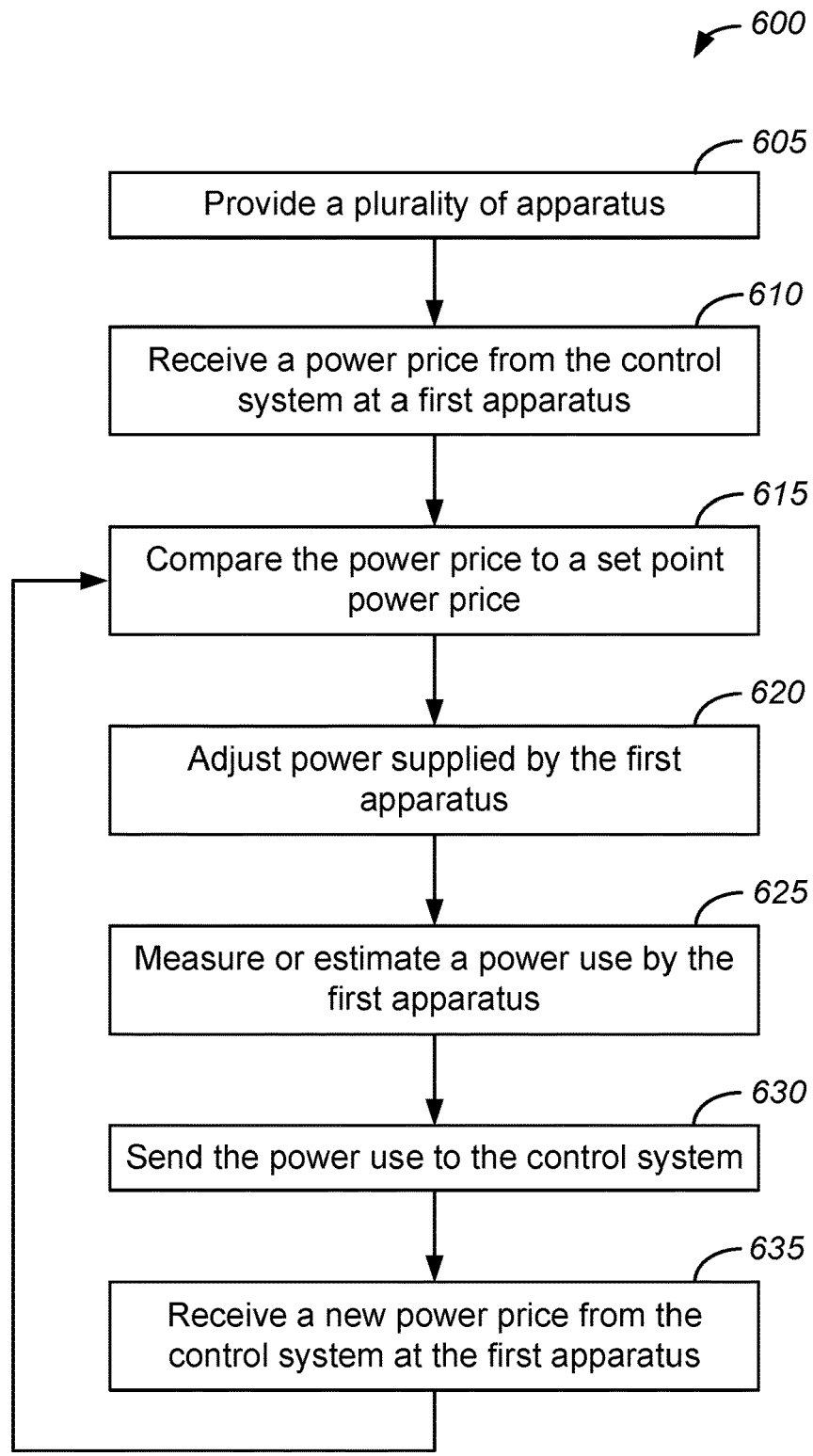
FIG. 6 shows an example of a process for controlling energy use by a building.

FIG. 6 shows an example of a process for controlling energy use by a building. In some embodiments, some operations of the method 600 are similar to the operations of the method 500 shown in FIG. 5. Starting at block 605 of the method 600 shown in FIG. 6, a plurality of local power apparatus is provided. The plurality of local power apparatus is located in a building, with each local power apparatus of the plurality of local power apparatus in communication with a control system of a building. The method 600 can be performed using any of the BACS, zone control systems, and local power apparatus described herein.

At block 610, a first local power apparatus of the plurality of local power apparatus receives a power price from the control system. While the method 600 is described with respect to a single apparatus (i.e., the first apparatus), the method may be performed concurrently with the plurality of apparatus. In some embodiments, the power price includes the current prices of power from utilities or the estimated future prices of power from utilities. In some embodiments, the power price includes a local price of power (i.e., the power price is not necessarily a utility power price). The price of power that the control system determines may depend on a number of factors. For example, even if power from the grid is expensive, the power price may be low due to local sources of power being available.

At block 615, the power price is compared to a set point power price. The set point power price includes a specified power price. In some embodiments, the comparison is performed with a price response function.

At block 620, power supplied to at least one of the light of the first apparatus, the heating/cooling device of the first apparatus, a lighting device in a region proximate the first apparatus, and a heating/cooling device in the region proximate the first apparatus is adjusted (e.g., increased or decreased) based on comparing power price to set point power price.

At block 625, a power use by the first apparatus of the plurality of apparatus is determined or estimated at the first apparatus. For example, after block 620, power use by the first apparatus may increase or decrease. This is the power use that is determined.

At block 630, the power use by the first apparatus is sent to the control system. After the control system receives the power use, the control system may determine a new power price, as described above at block 535 of the method 500.

At block 635, a new power price is received from the control system at the first apparatus of the plurality of apparatus. In some embodiments, the new power price is a higher price of power than the price of power in the power price. In some embodiments, the new power price is a lower price of power than the price of power in the power price. In some embodiments, the operation at block 635 is similar to the operation 610. After block 635, the process 600 may continue at blocks 615 and 620, with the new power price being used. The process 600 may then continue at blocks 625, 630, and 635.

In some embodiments of the methods 500 and 600, there is enough power available from utilities, local sources, or both to provide the needed power to operate the building. That is, in some embodiments, there is always enough power to power the building. In some embodiments of the methods 500 and 600, there is not enough power available from utilities, local sources, or both to provide the needed power to operate the building. Instances in which there is not enough power available to power the building may occur, for example, during heat waves, due to the failure of a portion of the power grid, or due to the failure of a utility (e.g., a coal power plant, a hydroelectric power plant, or a nuclear power plant), for example.

Figure 7:
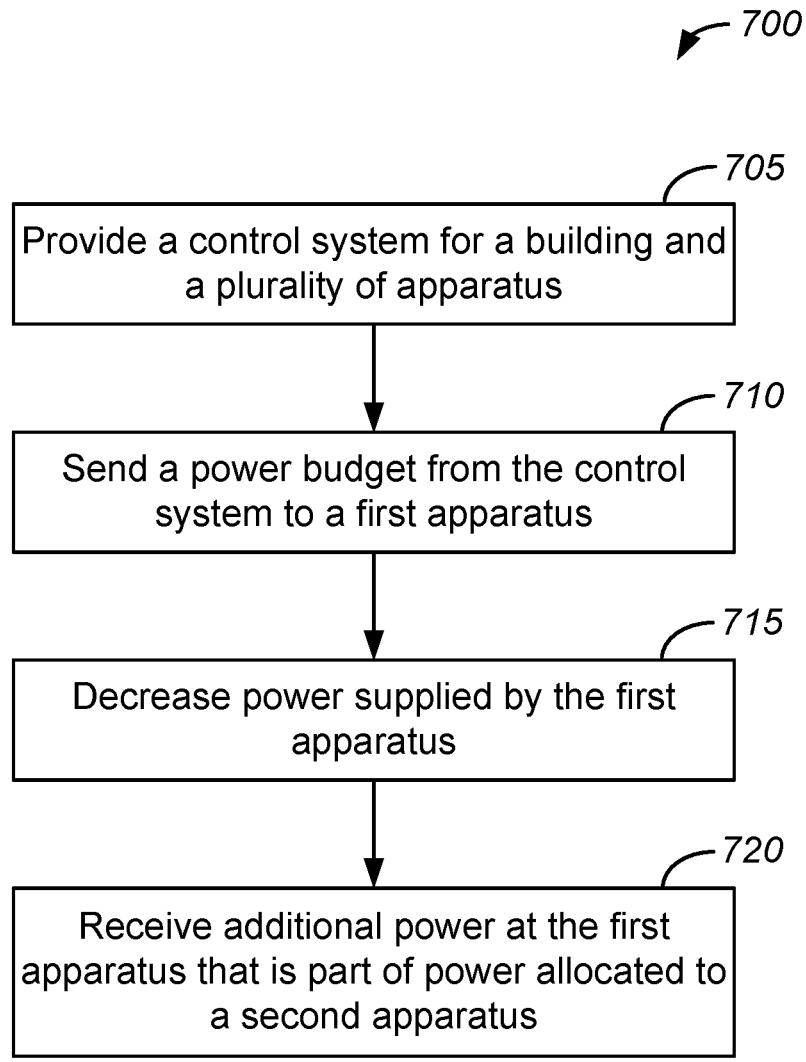
FIG. 7 shows an example of a process for controlling energy use by a building.

FIG. 7 shows an example of a process for controlling energy use by a building. In some embodiments, some operations of the method 700 are similar to or the same as the operations of the method 500 shown in FIG. 5. While the method 700 is described with respect to a single apparatus (i.e., the first apparatus), the method may be performed concurrently with the plurality of apparatus. Starting at block 705 of the method 700 shown in FIG. 7, a control system to control the electrical system of a building is provided. A plurality of local power apparatus also is provided.

At block 710, a power budget is sent from the control system to a first apparatus. For example, when the power available is 90% of the power being used by the building, the power budget may specify a 10% reduction in the power used at the first apparatus. As another example, the power budget may specify the power to be used by the first apparatus is 1000 Watts, 500 Watts, or some other value.

At block 715, the power supplied by the first apparatus is decreased. For example, the power supplied by the first apparatus to devices associated with the first apparatus or devices proximate to the first apparatus may be decreased such that the power supplied by the first apparatus is at or below the power budget. A user of the first apparatus can specify how the first apparatus will reduce the power supplied. For instance, the user may not be sensitive to temperature changes, but the user may always want a specified lighting. In this case, power supplied to the heating/cooling devices would be reduced.

In some instances, an apparatus of the plurality of apparatus (e.g., a second apparatus) may be supplying a power that is below the power budget. For example, at the second apparatus, the user may not be present so the second apparatus in not supplying much power. As another example, the user at the second apparatus may not need much light or temperature regulation, such that the power supplied by the second apparatus is below the power budget.

In such instances, at block 720, the first apparatus receives additional power that is part of power allocated to the second apparatus of the plurality of apparatus. A determination of which apparatus of the plurality of apparatus receives power allocated to the second apparatus can occur by a number of different methods. For example, in some embodiments, a determination is made by a bidding process in a computerized market place where users of apparatus offer funds for the excess power of the second apparatus. Described below is a detailed description of this transactional aspect and the communication mechanism of the system.

The Department of Energy's (DOE's) Building Technologies Office (BTO) is supporting the development of the concept of "Transactional Network" to enable energy transactions, operational transactions, and financial transactions between building systems (e.g., rooftop units—RTUs), and between building systems and the electric power grid. The term "energy transactions" refers to techniques for managing the generation, consumption, or flow of electric power within an electric power system through the use of economic or market based constructs while considering grid reliability constraints and building energy efficiency.

In this context, Pacific Northwest National Laboratory (PNNL) developed an open architecture agent based platform, a transaction based framework called Volttron. Agents communicate by the way of a publish—subscribe pattern. Agents publish messages to the message bus topics and agents that need these messages subscribe to the respective topics and are notified when new messages are posted to the topic.

In some embodiments of the systems and methods described above, instances of the Volttron framework are running on all the controllers (e.g., building controller, zone controller, local power apparatus controller, and energy strip controller (e.g., an energy strip that is operable to identify plug loads through power characteristics)).

In some embodiments, a VolttronBridge agent is operable to transfer messages from one Volttron instance to another Volttron instance. For example, messages may be transferred between various instances using Volttron WebRPC (e.g., a remote procedure call over TCP/IP) mechanism.

For example, for communication between a zone and a local power apparatus associated with the zone, VolttronBridge on the zone controller allows the local power apparatus to register and whenever energy demand is posted, the agent posts it to the local bus on the zone. For example, the topic may be "zone/energydemand/<deviceId>/value." Similarly, when the grid controller on the zone publishes a new power price to the topic "zone/powerprice," the same is posted to the downstream VolttronBridge which in turn publishes it to its local bus.

Figure 8:
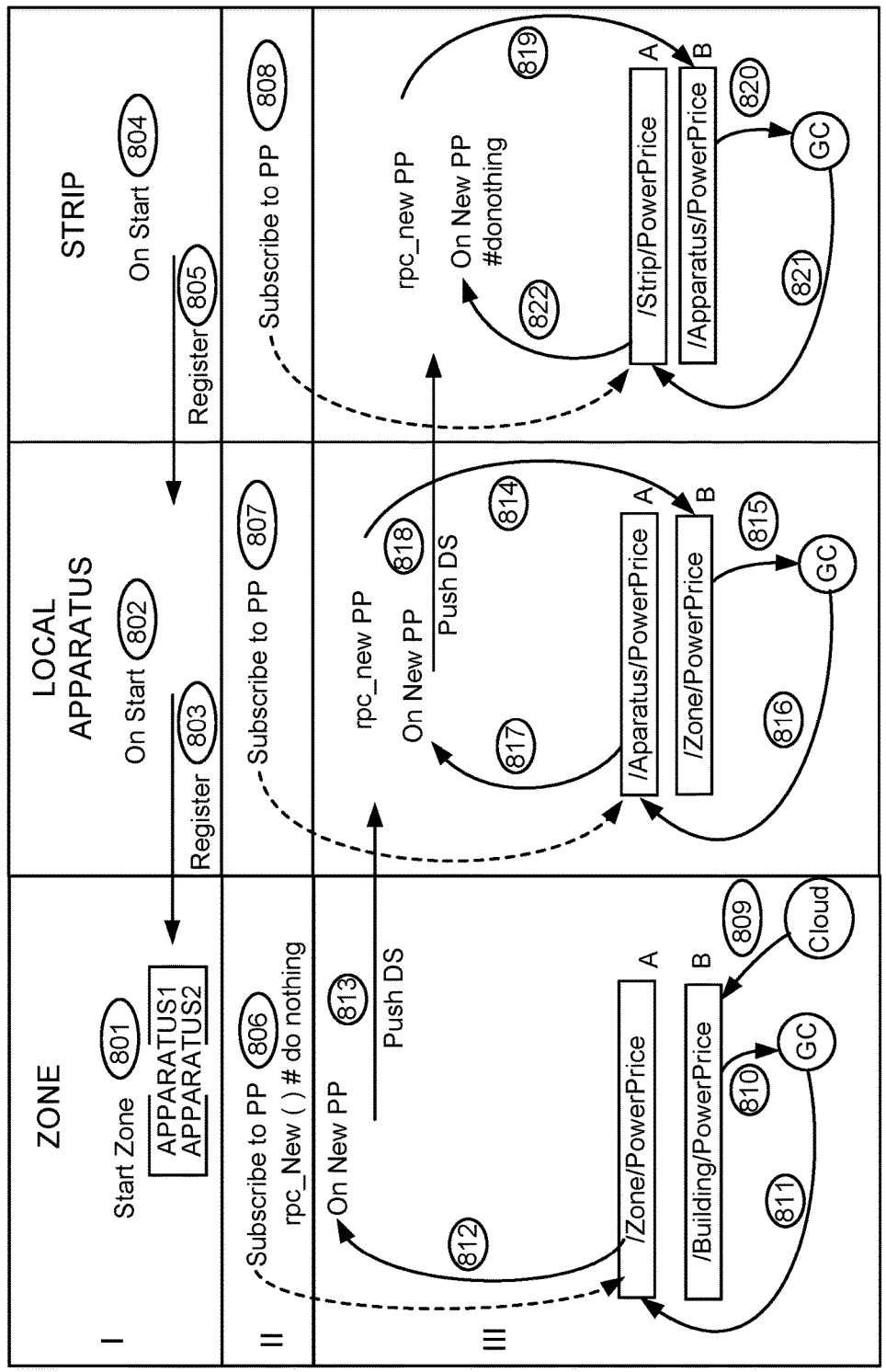
FIG. 8 shows an example of a new power price is communicated to a local power apparatus.

Referring to FIG. 8, in stage I (initial stage), when the device boots up, the device registers with the upstream controller and associates with it. The controller also maintains a registry of all the downstream (DS) controllers. For example, an energy strip associates with a local power apparatus, the local power apparatus associates with a zone controller, and the zone controller associates with a building controller (801, 802, 803, 804, and 805). In stage II (subscription stage), individual controllers subscribe to the corresponding topics (806, 807, and 808). In stage III, when messages are posted to the above subscribed topic, the bridge transfers the messages to the downstream controller by calling a remote procedure on the downstream instance that in turn posts the message to the local bus in the downstream device (812, 813, 814, 817, 818, 819, and 822).

To illustrate an end-to-end use case, assume that a new power price is received by a zone controller from the cloud or from the building (809). The message is picked up by a GridController (GC) agent (810) in the zone and the GC computes a new power price for the downstream based on its local energy demand and resource (local storage, etc.,) availability and published this price to zone powerprice topic (811). This zone price is picked up by the bridge agent (812) and calls remote procedure API (rpc_newPP) on all the registered DS local power apparatus (813). The new power price API (rpc_newPP) on each local power apparatus in turn post this new power price to the local message bus (814). The new power price is picked up by the local apparatus GC agent (815). A new power price, based on local constraints such as storage status, total local energy demand including cooling/heating, lighting, etc., is computed and published to the apparatus powerprice topic (816). This apparatus price is picked up by the bridge agent (817), which calls a remote procedure API (rpc_newPP) on all the registered DS strips (818). The new power price API (rpc_newPP) on each strip in turn posts this new power price to the strip local bus (819). In the energy strip, the message is picked up by the strip GC agent (820) that in turn computes a new power price based on local constraints, such as a number of plugged in devices, their state, etc. This price is published to strip powerprice topic (821). The newly published power price (in cases of zone—/Zone/Powerprice, in cases of local apparatus—/Apparatus/Powerprice, and in cases of strip—/Strip/Powerprice) is compared to the threshold limits and the apparatus shuts off power to at least some or all of the devices associated with the apparatus.

When there is a change in state of any of the locally connected device energy demand, the corresponding agent on the device computes the new or predicted energy demand and posts it to the local message bus. The bridge agent picks up this message and transfers it to the upstream controller message bus by calling its remote procedure API. The remote procedure in turn posts the new energy demand to its local bus. The corresponding agent in the upstream controller acts upon this new energy demand.

For example, if any new plug is connected the energy strip, the energy strip computes the new energy demand and posts it to the local bus. The bridge agent on the energy strip picks up this message and calls a new energy demand procedure on the local power apparatus. The procedure on the local power apparatus posts this message to the local power apparatus' message bus. Any agent in the local power apparatus can pick this message and act on it. For example, the local power apparatus controller agent can pick up this message, compute the changed local energy demand, and post the new energy demand to local power apparatus' message bus. The bridge agent on the local power apparatus can pick up the new energy demand and transfers it to the zone.

When a user decides to bid for deficit energy budget, the local power apparatus posts the deficit quantity and the rates to the local bus. These messages are transferred by the VolttronBridge agent to the zone message bus. The exchange agent on the zone picks up this message and broadcasts the message to all of the connected local power apparatus in the zone. The exchange agent determines and enforces rules and procedures for the trading. Also, the exchange agent regulates the trades.

When any of the users accepts a bid to share their excess power, the corresponding agent on the user device (i.e., a local power apparatus) posts the acceptance to the local bus. The bridge agent transfer this acceptance to the zone message bus. The exchange agent in the zone updates the new budgets for the both the parties and posts to local message bus, which in turn is transferred to respective device buses by the bridge agent. Similarly, a user with excess energy budget may decide to sell. These transactions may be performed with credits (e.g., green reward points) or money.

Systems and apparatus described herein can also be operated according to additional embodiments. For example, in some embodiments, the system can be operated as follows. Using a rules that take into account electricity price (e.g., with optional forecast), occupancy, comfort, and the type of task to be performed, the system can perform functions on a building zone level or a workstation level that include one or more of the following: (1) integrating control of HVAC, lighting, and plug loads into one platform, in order to provide better control (i.e., save energy) and reduce the cost of controls; (2) applying transaction-based controls at the level of the individual workstation, using personalized controls, to reduce the use of energy resources; (3) using an integrated controls platform to reduce energy and load in grid-islanded, "resource constrained" buildings; (4) developing task-ambient lighting and air movement systems that reduce their power use in a way that maintains occupant comfort and productivity; and (5) demonstrating that control of a group of office workstations can have a measurable energy savings and load reduction effect on a building zone.

In some embodiments, the system manages local loads based on local preferences, a pricing signal, and local sensors. When the electrical system is constrained, for example, when the electricity grid is down and a generator is providing electricity to the building, then the price of electricity will be higher. In these constrained cases it is important to conserve energy and reduce load. The system can decide how to reduce the energy consumption at the workstation or zone level in a building. Another example where a reduction of electrical loads can be important is to help stabilize the grid when there are a strong fluctuations of renewable energy production such as photovoltaic (PV) power and wind power. By managing electrical loads at a fine level (e.g., workstations instead of whole building), larger savings are possible while maintaining comfort and functionality.

In some embodiments, system components are distributed at a workstation level and/or a zone level, such as: (1) integrated with building end-uses (e.g., HVAC, lighting, and plugs); and/or (2) integrated with a centralized control system.

In some embodiments, a function of the systems, methods, and apparatus described herein is building energy management. Energy use by a building may be managed by intelligent, customized control of end-uses, based on energy price, state of a device (charged/ not charged), occupancy (present/absent), criticality of end-use, personal comfort band, and the like. Examples include the control of temperature of a chilled water supply to control surface temperature of radiantly cooled desktop, the control of voltage for heating for the radiant heated desk, the control of a fan, the control of a light, and the like.

In some embodiments, secondary functions and applications of systems, methods, and apparatus describe herein are based on considerations such as: (1) indoor location services, such as provider and user; (2) acoustic, for noise masking applications; and (3) environmental health and safety, for vibration sensing for earthquakes, and personalized evacuation Components in local power apparatus may include one or more, or all, of the following:
primary sensors: (1) thermal/environmental sensors (mean radiant temperature sensor, air movement sensor, infra-red camera sensor, relative humidity (RH) sensor, carbon dioxide ($CO_2$) sensor, carbon monoxide (CO) sensor, particulate matter (PM2.5) sensor); (2) visual sensors (fish-eye camera, glare sensing); (3) a device to identify type of devices plugged in to the local power apparatus, and their status;
secondary sensors: (1) acoustic sensors; (2) vibration sensing for earthquake detection; (3) location sensing for providing location based services indoors;
actuators/control system: relay or other signaling method to control the plugged in global and local devices;
devices to control the local environment: (1) fan, with or without thermoelectric chip; (2) light.

Embodiments of the system can integrate localized HVAC and controls, local and ambient lighting, local and zone based electrical loads, while responding to electric price signal, based on user preferences and comfort requirements. In some embodiments, the price can be a local price (i.e., the price does not necessary need to be a utility price). The price can be used in combination with user preferences and local conditions to determine the optimal configuration of various electrical and thermal loads.

The use of the system may comprise one or more of the following components: (1) local and zone conditions, (2) local and zone level controls, (3) responding to the price signal, and (4) control electric loads based on these aspects. The system can provide demand response services (i.e., reducing the electrical load) at a level such as workstation level equipment, while understanding the occupant's actions and comfort levels.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   (a) providing a plurality of apparatus, each apparatus of the plurality of apparatus comprising:
      a controller, the controller in communication with a control system, the control system comprising a building automation and control system (BACS) operable to control energy use of a building, the controller operable to control energy use of the apparatus;
      an input device to accept user input, the input device in communication with the controller;
      environmental sensors in communication with the controller;
      a light;
      a heating/cooling device; and
      a housing, the controller, the environmental sensors, the input device, the light, and the heating/cooling device being mounted to the housing, the housing being able to be placed on a table that is positioned within the building, the controller operable to actuate the light and the heating/cooling device;
   (b) receiving a power price from the control system at a first apparatus of the plurality of apparatus;
   (c) comparing the power price to a set point power price; and
   (d) adjusting power supplied each of the light of the first apparatus, the heating/cooling device of the first apparatus, a lighting device in a region proximate the first apparatus, and a heating/cooling device in the region proximate the first apparatus based on comparing the power price to the set point power price.

2. The method of claim 1, further comprising:
   (e) measuring or estimating a power use by the first apparatus of the plurality of apparatus;
   (f) sending the power use to the control system; and
   (g) receiving a new power price from the control system at the first apparatus of the plurality of apparatus.

3. The method of claim 1, wherein the power supplied is adjusted to at least one of the light of the first apparatus, the heating/cooling device of the first apparatus, a lighting device in the region proximate the first apparatus, and a heating/cooling device in the region proximate the first apparatus is based on input from the environmental sensors.

4. The method of claim 1, wherein the first apparatus further comprises an electrical output interface, and wherein the method further comprises adjusting power supplied to the electrical output interface in operation (d).

5. The apparatus of claim 1, wherein the first apparatus further comprises a wireless network interface, and wherein the first apparatus receives the power price from the control system through the wireless network interface.

6. The method of claim 1, wherein operation (d) includes reducing power supplied to at least one of the light of the first apparatus, the heating/cooling device of the first apparatus, the lighting device in the region proximate the first apparatus, and the heating/cooling device in the region proximate the first apparatus when the power price is greater than the set point power price.

7. A method comprising:
   (a) providing a control system comprising a building automation and control system (BACS) operable to control energy use of a building and a plurality of apparatus, each apparatus of the plurality of apparatus comprising:
      a controller, the controller in communication with the control system
      an input device to accept user input, the input device in communication with the controller;
      environmental sensors in communication with the controller;
      a light;
      a heating/cooling device; and
      a housing, the controller, the environmental sensors, the input device, the light, and the heating/cooling device being mounted to the housing, the housing being able to be placed on a table that is positioned within the building, the controller operable to actuate the light and the heating/cooling device;

(b) sending a power price from the control system to a first apparatus of the plurality of apparatus;

(c) comparing the power price to a set point power price at the first apparatus; and (d) adjusting power supplied to each of the light of the first apparatus, the heating/cooling device of the first apparatus, a lighting device in a region proximate the first apparatus, and a heating/cooling device in the region proximate the first apparatus based on comparing the power price to the set point power price.

8. The method of claim 7, further comprising:

(e) measuring or estimating a power use by the first apparatus of the plurality of apparatus at the first apparatus;

(f) receiving the power use at the control system; and (g) determining a new power price.

9. The method of claim 7, wherein the power supplied is adjusted to at least one of the light of the first apparatus, the heating/cooling device of the first apparatus, a lighting device in the region proximate the first apparatus, and a heating/cooling device in the region proximate the first apparatus is based on input from the environmental sensors.

10. The method of claim 7, wherein the first apparatus further comprises an electrical output interface, and wherein the method further comprises adjusting power supplied to the electrical output interface in operation (d).

11. The apparatus of claim 7, wherein the first apparatus further comprises a wireless network interface, and wherein the control system sends the power price to the first apparatus via the wireless network interface.

12. The method of claim 7, wherein operation (d) includes reducing power supplied to at least one of the light of the first apparatus, the heating/cooling device of the first apparatus, the lighting device in the region proximate the first apparatus, and the heating/cooling device in the region proximate the first apparatus when the power price is greater than the set point power price.

* * * * *